United States Patent
Lackey et al.

(10) Patent No.: US 11,174,822 B1
(45) Date of Patent: Nov. 16, 2021

(54) TURBOCHARGER COMPRESSOR BYPASS COAXIAL RE-INTRODUCTION SYSTEM TO OPTIMIZE TRANSIENT LOAD RESPONSE

(71) Applicant: Cummins Power Generation Inc., Minneapolis, MN (US)

(72) Inventors: Jeremy A. Lackey, Scottsburg, IN (US); Alan C. Anderson, Columbus, IN (US); Joshua Bradley Bettis, Columbus, IN (US); Steven L. Leffler, Vincennes, IN (US); Dilip Ramachandran, Columbus, IN (US); John A. Rennekamp, Seymour, IN (US); Axel O. Zur Loye, Columbus, IN (US); Andrew Guy Kitchen, Daventry (GB); George Martin Tolhurst, Rugby (GB)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 16/927,606

(22) Filed: Jul. 13, 2020

(51) Int. Cl.
| | |
|---|---|
| *F02M 26/05* | (2016.01) |
| *F02D 41/00* | (2006.01) |
| *F02B 37/16* | (2006.01) |
| *F02B 37/18* | (2006.01) |

(52) U.S. Cl.
CPC .............. *F02M 26/05* (2016.02); *F02B 37/16* (2013.01); *F02B 37/18* (2013.01); *F02D 41/0007* (2013.01); *F02D 2200/0406* (2013.01)

(58) Field of Classification Search
CPC ......... F02M 26/05; F02B 37/18; F02B 37/16; F02D 41/0007; F02D 2200/0406
See application file for complete search history.

(56) References Cited

U.S. PATENT DOCUMENTS

| | | | |
|---|---|---|---|
| 9,828,922 B2 * | 11/2017 | Kemmerling | .......... F02M 26/07 |
| 2007/0039320 A1 | 2/2007 | Gu et al. | |
| 2007/0217902 A1 | 9/2007 | Sirakov et al. | |
| 2014/0208788 A1 | 7/2014 | Brasz et al. | |

FOREIGN PATENT DOCUMENTS

| | | |
|---|---|---|
| DE | 10 2017 012 253 A1 | 4/2019 |
| WO | WO-2018/152163 A1 | 8/2018 |

OTHER PUBLICATIONS

International Search Report Issued in PCT/US2021/041013 dated Sep. 22, 2021, 16 pages.

* cited by examiner

*Primary Examiner* — Audrey B. Walter
*Assistant Examiner* — Edward Bushard
(74) *Attorney, Agent, or Firm* — Foley & Lardner LLP

(57) ABSTRACT

A compressor bypass reintroduction system includes a compressor intake manifold and a bypass conduit. The compressor intake manifold defines a fluid plenum. The compressor intake manifold is engageable with a compressor. The bypass conduit extends into the fluid plenum and includes an ejector line. The ejector line is configured to be substantially collinear with the compressor and to discharge flow toward the compressor. In some embodiments, an outlet of the ejector is disposed proximate to an outlet of the fluid plenum that discharges flow into the compressor.

25 Claims, 6 Drawing Sheets
(1 of 6 Drawing Sheet(s) Filed in Color)

US 11,174,822 B1

TURBOCHARGER COMPRESSOR BYPASS COAXIAL RE-INTRODUCTION SYSTEM TO OPTIMIZE TRANSIENT LOAD RESPONSE

TECHNICAL FIELD

The present disclosure relates generally to air/fuel intake systems for turbocharged gaseous fueled engine systems.

BACKGROUND

Many gaseous fueled engine systems use turbochargers to improve the efficiency (e.g., fuel consumption) and power output of the engine system. The turbocharger compressor compresses incoming air, increasing the density of the air, to thereby allow more power per engine cycle. In some instances, a portion of the compressed air and/or air/fuel mixture bypasses the engine downstream of the compressor. This bypassed portion of the mixture may be reintroduced into the fresh air intake system upstream of the compressor to prevent the loss of excess air/fuel charge. However, reintroducing this excess air/fuel mixture at the compressor inlet can cause various issues with the performance of the engine system.

SUMMARY

One embodiment of the present disclosure relates to a compressor bypass reintroduction system. The compressor bypass reintroduction system includes a compressor intake manifold and a bypass conduit. The compressor intake manifold defines a fluid plenum. The compressor intake manifold is engageable with a compressor. The bypass conduit extends into the fluid plenum and includes an ejector line. The ejector line is configured to be substantially collinear with the compressor and to discharge flow toward the compressor.

In some embodiments, an outlet of the ejector line is disposed proximate to an outlet of the fluid plenum that discharges flow into the compressor. In some embodiments, the compressor bypass reintroduction system further includes a fuel injection device disposed downstream of the bypass conduit. The ejector line may be substantially collinear with a central axis of the fluid injection device.

In some embodiments, the compressor bypass reintroduction system further includes a compressor bypass valve coupled to the bypass conduit and configured to regulate flow through the bypass conduit.

In some embodiments, a hydraulic diameter of the bypass conduit is approximately constant along an entire length of the bypass conduit.

In some embodiments, the bypass conduit includes a header line fluidly coupled to the ejector line and configured to deliver flow to the ejector line. The ejector line may be one of a plurality of ejector lines coupled to the header line. In some embodiments, the ejector line protrudes into the header line. In some embodiments, the ejector line is configured to be substantially collinear with an axis of a compressor impeller.

Another embodiment of the present disclosure is a compressor bypass reintroduction system. The compressor bypass reintroduction system includes a compressor intake manifold, an inlet transition, and a bypass conduit. The compressor intake manifold defines a fluid plenum. The inlet transition is coupled to the compressor intake manifold and is fluidly connected to the fluid plenum. The bypass conduit extends into the fluid plenum and includes an ejector line that is substantially collinear with the inlet transition. The ejector line includes an outlet that faces the inlet transition.

Another embodiment of the present disclosure is an intake system for an engine. The intake system includes a compressor; a compressor intake manifold defining a fluid plenum; and a compressor bypass reintroduction system. The compressor bypass reintroduction system includes an inlet transition and a bypass conduit. The inlet transition is coupled to the compressor intake manifold and fluidly connects the fluid plenum to the compressor. The bypass conduit includes an ejector line that is substantially collinear with the compressor and is configured to discharge flow towards the compressor.

In some embodiments, the compressor is one of a plurality of compressors, the inlet transition is one of a plurality of inlet transitions fluidly coupled to a respective one of the plurality of compressors, and the ejector line is one of a plurality of ejector lines. An outlet of each ejector line of the plurality of ejector lines may be disposed at an inlet of a respective one of the plurality of inlet transitions to balance flow to each of the plurality of compressors.

In some embodiments, fluid flow discharged from the ejector line increases a velocity of fluid passing through the inlet transition so as to reduce pressure loss across the inlet transition.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appended at the end of this disclosure are contemplated as being part of the subject matter disclosed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
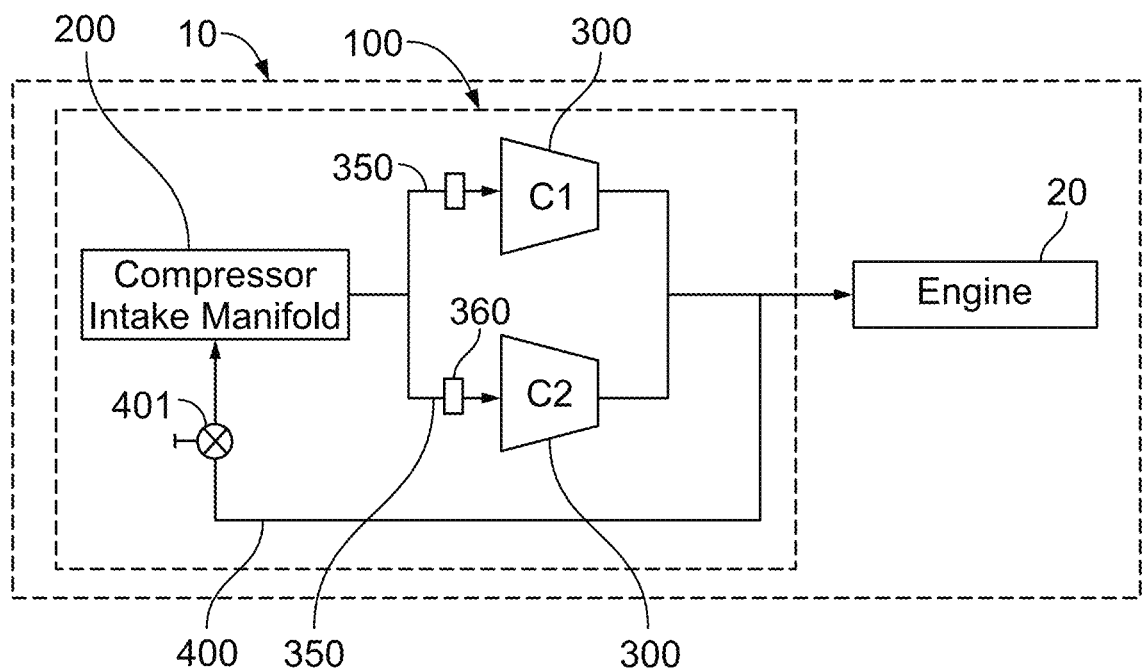
FIG. 1 is a block diagram of an engine system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to methods and devices for reintroducing a bypassed air/fuel mixture into an engine air intake system. In particular, embodiments described herein relate generally to a compressor bypass reintroduction system for introducing a bypassed fuel/air mixture upstream of a turbocharger compressor.

In various traditional turbocharged engine systems, any excess compressed air/fuel mixture (e.g., excess air/fuel charge), which bypasses the engine downstream of the turbocharger compressor, is redirected through fluid plena (plenums) and/or a conduit back toward an upstream end of the compressor. However, reintroducing this excess air/fuel charge can result in unstable and/or inefficient engine performance due, in part, to the difference in fluid velocity and pressure between the upstream and downstream ends of the compressor. These issues may be particularly troublesome during rapid engine load transitions in which a rate of fuel supply to the engine (e.g., the flow rate of fuel provided to the engine) is quickly increased or decreased.

The compressor bypass reintroduction system of the present disclosure mitigates the aforementioned performance effects by controlling the flow path used to introduce the excess air/fuel charge upstream of the compressor. The compressor bypass reintroduction system includes a bypass conduit that extends into a compressor intake manifold of the turbocharger compressor. The bypass conduit has an approximately constant hydraulic flow area along an entire length of the bypass conduit. Additionally, the bypass conduit is sized to maintain the high velocity of the excess air/fuel charge returning to the upstream end of the compressor so as to reduce the residence time that is required for the air/fuel mixture to pass through the bypass conduit.

The bypass conduit reintroduces the excess air/fuel charge as close to an inlet of the compressor as possible. This structure improves uniformity of flow entering the compressor impeller (e.g., wheel), which also improves the aerodynamic performance of the compressor (e.g., reducing flow separation and non-uniformity, etc.). In addition to improving the performance of the compressor, ensuring a uniform density cross-section of the charge entering the compressor reduces cyclic reversing loads, which can cause resonance in the compressor and shorten its operating life. The bypass conduit may include a header line and an ejector line extending away from the header line and toward an inlet transition for the compressor. An outlet end of the ejector line may be disposed at an inlet to the inlet transition so as to reduce the amount of fluid mixing and fluid velocity loss within the compressor intake manifold before the inlet transition.

In some embodiments, an outlet end of the ejector line is arranged coaxially with the inlet transition and in a direction that is substantially parallel to incoming air flow through the compressor intake manifold. The discharge leaving the ejector line increases the velocity of the surrounding intake air by creating a low pressure region at the inlet transition, which reduces the overall pressure loss through the compressor intake manifold. The various concepts introduced above and discussed in greater detail below may be implemented in any of numerous ways, as the described concepts are not limited to any particular manner of implementation. Examples of specific implementations and applications are provided primarily for illustrative purposes.

Various numerical values herein are provided for reference purposes only. Unless otherwise indicated, all numbers expressing quantities of properties, parameters, conditions, and so forth, used in the specification and claims are to be understood as being modified in all instances by the term "approximately." Accordingly, unless indicated to the contrary, the numerical parameters set forth in the following specification and attached claims are approximations. Any numerical parameter should at least be construed in light of the number reported significant digits and by applying ordinary rounding techniques. The term "approximately" when used before a numerical designation, e.g., a quantity and/or an amount including range, indicates approximations which may vary by (+) or (−) 10%, 5%, or 1%.

As will be understood by one of skill in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

FIG. 1 is a block diagram of a turbocharged gaseous fueled engine system, shown as engine system 10, according to at least one embodiment. The engine system 10 includes an engine 20 and an intake system 100. The engine 20 may be a diesel engine, a gasoline engine, a natural gas engine, a dual fuel engine, a biodiesel engine, an E85 engine, a flex fuel engine, a gas turbine, or another type of internal combustion engine or driver. In various embodiments, the engine 20 may be a high horse power (HHP) engine, such as, for example, an engine capable of providing power in the range of 500 hp to 4,500 hp or more. The engine system 10 may be used to power an electric power generator (e.g., genset, etc.) used to produce electricity (e.g., power), an alternator, or the like. In one embodiment, the engine 20 is coupled to the generator by, for example, a driveshaft (not shown). In other embodiments, the engine system 10 may be used to power a truck, a boat, a locomotive, or another type of vehicle (e.g., an on-road or off-road vehicle). In yet other embodiments, the engine system 10 may be used in an industrial application to drive a pump, hydraulic system, or another type of system.

The intake system 100 provides clean air and/or fuel to the engine 20. In some embodiments, the intake system 100 also provides recirculated exhaust gases to the engine 20. For example, the intake system 100 may form part of an exhaust gas recirculation system for the engine 20. As shown in FIG. 1, the intake system 100 includes a compressor intake manifold 200; at least one turbocharger compressor, shown as compressors 300; a plurality of inlet transitions 350 (e.g., inlet conduit portions or segments); a fuel mixer 360; and a bypass conduit 400. The compressor intake manifold 200 receives fresh air from an environment surrounding the engine system 10, filters the air, and delivers the filtered air to the compressors 300. As shown in FIG. 1, an outlet of the compressor intake manifold 200 is fluidly connected to each of the compressors 300 by the inlet transitions 350. In other embodiments, each compressor 300 is paired with its own separate compressor intake manifold 200. In the embodiment of FIG. 1, the compressors 300 (and inlet transitions 350) are disposed in a substantially parallel arrangement downstream of the compressor intake manifold 200.

The compressors 300 draw in the filtered air from the compressor intake manifold 200 and compress the air before delivering the charge air (e.g., compressed air, etc.) to the engine 20 (e.g., via at least one intake manifold between the compressors 300 and the engine 20, etc.). The compressors 300 increase the mass of air entering the engine during each engine cycle, which increases the volumetric efficiency and power production of the engine 20. Each of the compressors 300 includes an impeller (e.g., a rotor) that rotates at high speed to draw in and pressurize the filtered air. The impeller is mechanically connected to a turbine, which powers the impeller by recovering some of the enthalpy and kinetic energy of the exhaust gasses leaving the engine 20. In other embodiments, the impeller is driven by an electric motor, an engine crankshaft, and/or another source of shaft power. The size and geometry of each compressor impeller (and other parts of the turbocharger system) may vary depending on the required engine air flow rate, the desired compression ratio of air across the compressor 300, and other factors. The performance of each compressor 300 within the intake system 100 may also vary depending on a variety of factors, including the design of the intake system upstream of the compressor 300 (e.g., the velocity profile of flow entering the compressor 300, the compressor inlet pressure, etc.). The number and arrangement of components (e.g., the compressor intake manifold 200, the compressors 300, inlet transitions 350, and the bypass conduit 400, etc.) shown in FIG. 1 are provided for illustrative purposes only. It will be appreciated that various alternatives are possible without departing from the inventive concepts disclosed herein.

The intake system 100 may also include fuel injection system components (not shown) such as a fuel module, fuel injectors, carburetors, fuel flow control valves, and other equipment to introduce fuel into the charge air before injecting the air/fuel mixture (e.g., air/fuel charge, etc.) into the engine 20 and/or compressors 300. As shown in FIG. 1, the intake system 100 includes a fuel injection device, shown as fuel mixer 360, configured to introduce fuel into the fresh air flow downstream of the inlet transition 350, between the bypass conduit 400 and the compressor 300. In other embodiments, the intake system 100 may include additional, fewer, and/or different fuel injection system components.

As shown in FIG. 1, the intake system 100 also includes a compressor bypass reintroduction system including a bypass conduit 400 that is structured to redirect (e.g., reroute, etc.) any excess compressed air/fuel charge that has bypassed the engine 20 to a location upstream of the compressors 300 (e.g., the compressor intake manifold 200). In the embodiment of FIG. 1, the bypass conduit 400 includes at least one compressor bypass valve 401 that regulates the amount of flow through the bypass conduit 400. The compressor bypass valve 401 may be a flow regulator valve (e.g., a butterfly valve, etc.) or another type of flow control valve. In other embodiments, the bypass conduit 400 may not include a compressor bypass valve 401. Although the compressor bypass valve 401 is located upstream of the compressor intake manifold 200 in FIG. 1, it will be appreciated that the location of the compressor bypass valve 401 may differ in various embodiments (e.g., the compressor bypass valve 401 may be located at least partially within the compressor intake manifold 200, etc.).

As used herein, the term "excess air/fuel charge" refers to a portion of the compressed air/fuel mixture, downstream of the compressors 300, that bypasses the engine 20. This portion of the compressed air/fuel mixture is redirected by the bypass conduit 400 to the compressor intake manifold 200 upstream of the compressors 300 to improve the efficiency of the engine system 10 (e.g., to reduce fuel loss, etc.). The excess air/fuel charge is a mixture of clean filtered air and fuel (e.g., compressed natural gas, etc.) that has a higher velocity and pressure than the filtered air entering the compressor intake manifold 200 from the surroundings.

Figure 2:
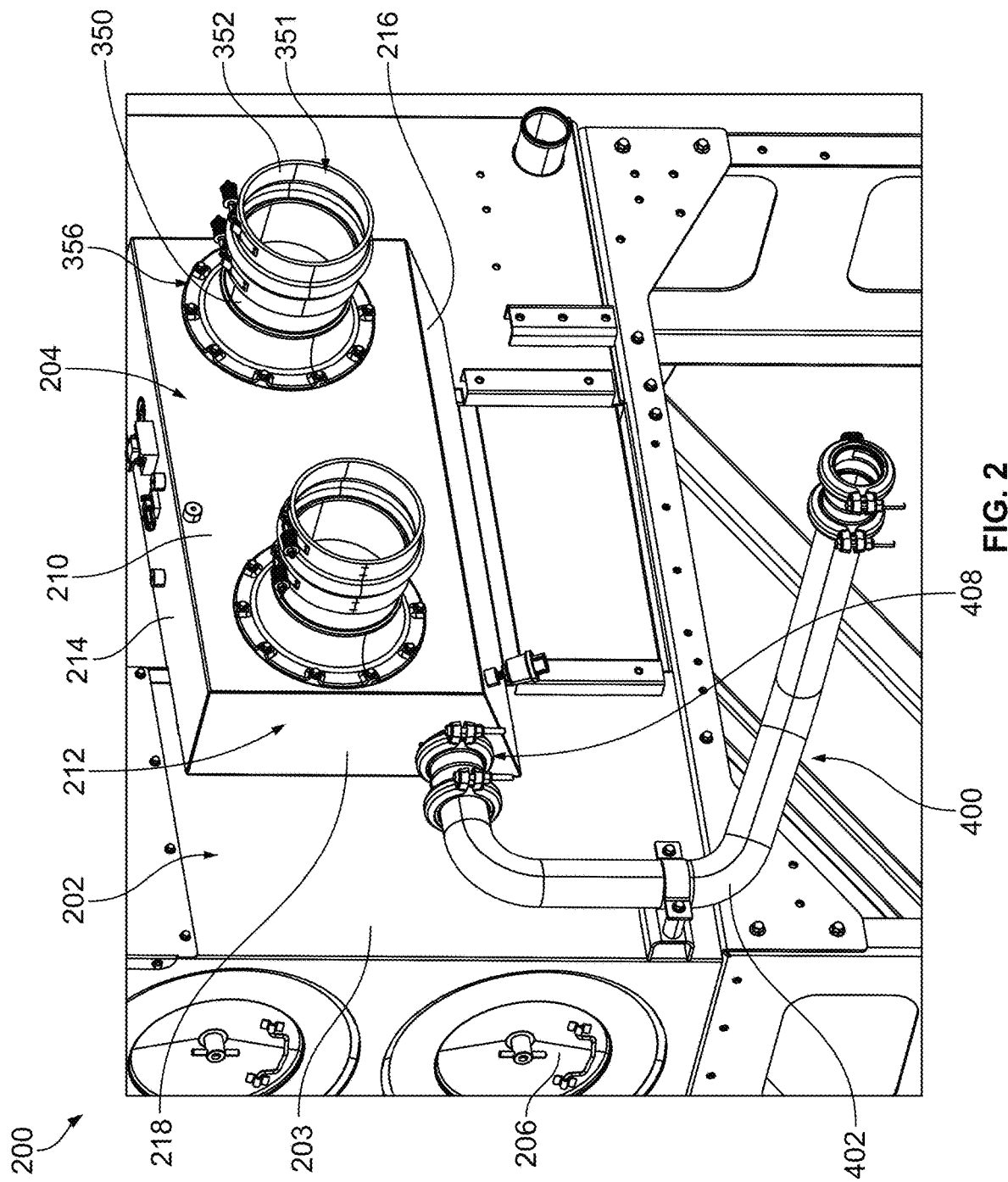
FIG. 2 is a perspective view of an intake system of a turbocharged gaseous fueled engine system, according to an embodiment.

FIG. 2 shows a perspective view of the compressor intake manifold 200. The compressor intake manifold 200 is structured to clean the surrounding air and to deliver (e.g., direct, etc.) the filtered air into each one of the compressors 300. The compressor intake manifold 200 includes a main housing 202 and a compressor intake header 204. The main housing 202 is structured to draw in fresh ambient air from the surroundings and to filter the fresh air to remove particulate contamination from the ambient air. The main housing 202 includes plurality of filter cartridges 206 that fluidly connect the surroundings to an interior cavity defined by the main housing 202. The filter cartridges 206 are arranged in parallel to reduce pressure drop across the main housing 202 and to maximize the flow rate of air that can be provided to the engine 20 (see FIG. 1). Ambient air entering the main housing 202 enters through the filter cartridges 206 and passes through filter media contained within each of the filter cartridges 206, which remove particulate contamination (e.g., dirt, oil, and other contaminants) to produce clean filtered air.

The compressor intake header 204 is structured to receive the filtered air from the main housing 202 and to distribute the filtered air approximately uniformly between each of the compressors 300. As shown in FIG. 2, the compressor intake header 204 is engaged with and coupled to a substantially planar end wall 203 of the main housing 202 along an outer perimeter edge of the compressor intake header 204. The compressor intake header 204 includes a main body including a forward wall 210 and a plurality of side walls 212 extending between the forward wall 210 and the main housing 202. The plurality of side walls 212 include an upper wall 214, a lower wall 216 opposite the upper wall 214, and lateral walls 218 (e.g., left and right side walls as shown in FIG. 2) extending between and connecting the upper wall 214 and the lower wall 216. The upper wall 214 and the lateral walls 218 extend away from the forward wall 210 in a substantially perpendicular orientation relative to the forward wall 210. The lower wall 216 extends at an oblique angle from a lower edge of the forward wall 210 (e.g., downward and rearward of the lower edge) toward the end wall 203 of the main housing 202. In other embodiments, the number and arrangement of the side walls 212 may be different.

Figure 3:
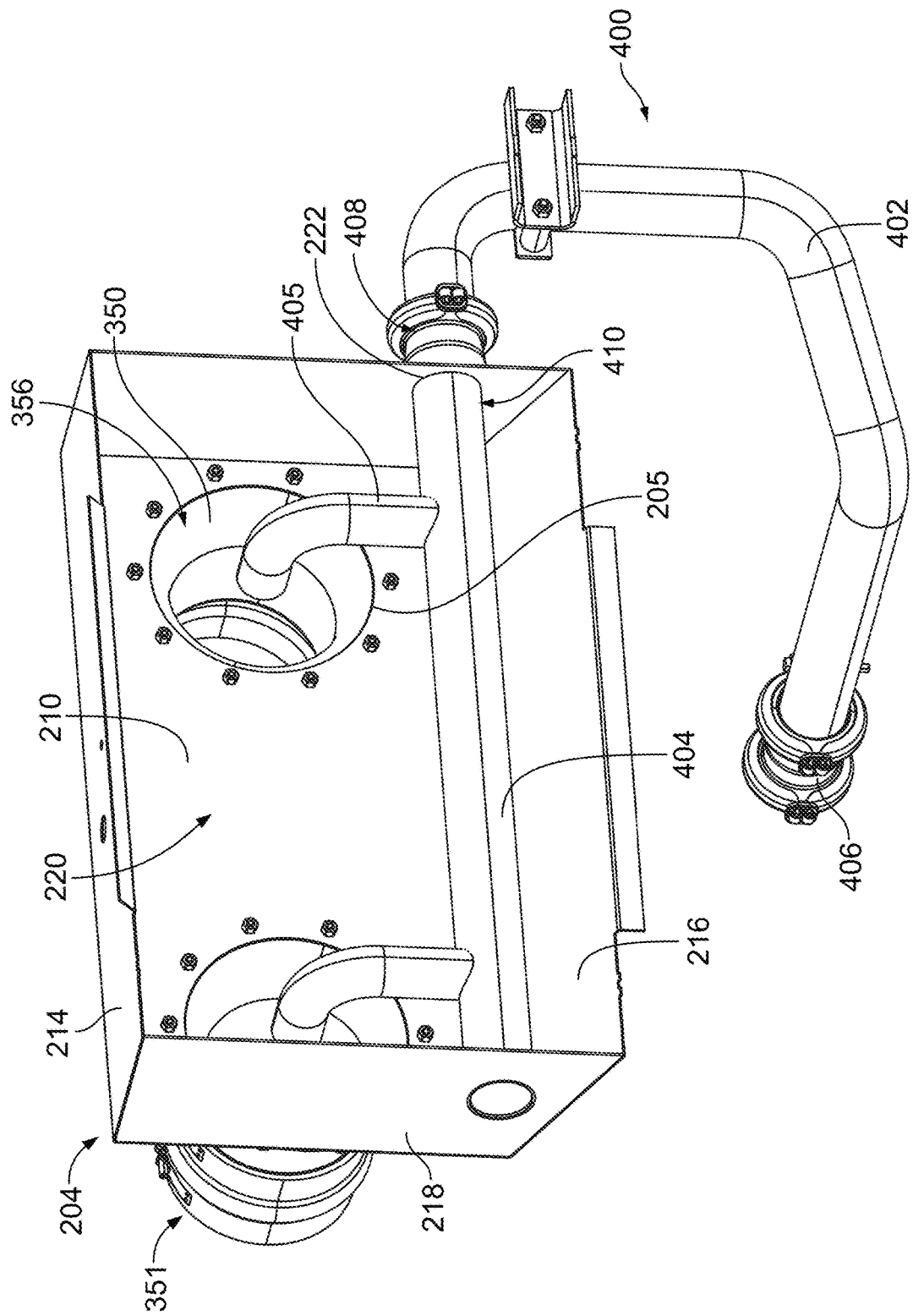
FIG. 3 is a rear perspective view of a compressor intake manifold of the intake system of FIG. 2.

As shown in FIG. 3, the forward wall 210, the upper wall 214, the lower wall 216, and the lateral walls 218 together form a fluid plenum 220 (e.g., hollow volume, hollow cavity, etc.) that is structured to receive the filtered air from the main housing 202 (see also FIG. 2). The fluid plenum 220 is fluidly connected to the interior cavity of the main housing 202 through an opening in the end wall 203 (e.g., a rectangular-shaped opening in the end wall 203).

As shown in FIGS. 2-3, fluid leaving the fluid plenum 220 is directed to the compressor 300 (see also FIG. 1) via a plurality of inlet transitions 350 that extend between the compressor intake header 204 and the compressors 300. An inlet end 356 of each of the inlet transitions 350 is mechanically connected (e.g., via rivets, bolts, screws, or another suitable fastener) to the forward wall 210 of the compressor intake header 204 and is fluidly connected to the fluid plenum 220 by a circular opening 205 in the forward wall 210. An outlet end 351 of each of the inlet transitions 350 is engageable with an inlet flange and/or connector of a respective one of the compressors 300. An inner diameter of each of the inlet transitions 350 decreases gradually in a flow direction (e.g., from the forward wall 210 toward the compressors 300, parallel to a central axis 354 of the inlet transitions 350, etc.) to lower the pressure drop across the inlet transitions 350 (e.g., to a minimum pressure drop) and to provide a more stable flow (e.g., to reduce the likelihood of flow separation). As shown in FIG. 2, the transitions 350 may include a flexible coupler 352 to accommodate axial misalignment between the compressor intake header 204 and the compressors 300 (see also FIG. 1).

As shown in FIGS. 2-3, the bypass conduit 400 is structured to direct the excess air/fuel charge into the compressor intake manifold 200. The bypass conduit 400 engages with the compressor intake manifold 200 at the compressor intake header 204. In the embodiment of FIGS. 2-3, the bypass conduit 400 includes an intermediate conduit 402, a header line 404, and a plurality of ejector lines 405. In other embodiments, the bypass conduit 400 may include additional, fewer, and/or different components.

The intermediate conduit 402 extends between the engine air/fuel intake system (not shown) and the compressor intake header 204 and fluidly connects the engine air/fuel intake system with the compressor intake header 204 via flexible couplers 406. The intermediate conduit 402 is a fluid conduit (e.g., tube, flow line, etc.) having an approximately constant hydraulic flow area (e.g., cross-sectional flow area, etc.) along its entire length, between opposing ends of the intermediate conduit 402. The intermediate conduit 402 may be made from tubing (e.g., steel tubing) that is bent or otherwise formed into multiple sections to facilitate engagement of the intermediate conduit 402 to both the air/fuel intake system and compressor intake header 204. In the embodiment of FIGS. 2-3, an outlet end 408 (e.g., distal end, etc.) of the intermediate conduit 402 is coupled to an inlet end 410 (e.g., proximal end, etc.) of the header line 404, which extends laterally outward from one of the lateral walls 218 in a substantially perpendicular orientation relative to the lateral wall 218.

The header line 404 is structured to receive the excess air/fuel charge from the intermediate conduit 402 and distribute the excess air/fuel charge to the plurality of ejector lines 405. As shown in FIG. 3, the header line 404 is engaged with and mechanically connected to the compressor intake header 204, to opposing side walls 212 (e.g., lateral walls 218) of the compressor intake header 204. The header line 404 is a straight (e.g., linear) section of fluid conduit that extends through openings 222 in each of the lateral walls 218 and into the fluid plenum 220. In the embodiment of FIG. 3, the header line 404 is substantially perpendicular to the lateral walls 218. In other embodiments, the orientation of the header line 404 with respect to the lateral walls 218 may be different. In yet other embodiments, the header line 404 may be supported by a bracket, flange, or another connector to another part of the compressor intake header 204 (e.g., the forward wall 210, the upper wall 214, the lower wall 216, etc.). In yet other embodiments, the header line 404 is supported at a location external to the compressor intake header 204.

As shown in FIG. 3, the header line 404 extends through a portion of the fluid plenum 220 below the circular openings 205 in the forward wall 210 such that the header line 404 does not substantially restrict (e.g., impede, etc.) flow through the circular openings 205. A hydraulic flow area (i.e., a cross-sectional flow area) of the header line 404 is approximately the same as the hydraulic flow area through the intermediate conduit 402, which, advantageously, maintains the high velocity of the excess air/fuel charge as it passes through the bypass conduit 400. In the embodiment of FIG. 3, a hydraulic diameter (e.g., inner diameter for a circular conduit) of the header line 404 is approximately the same a hydraulic of the intermediate conduit 402.

Figure 4:
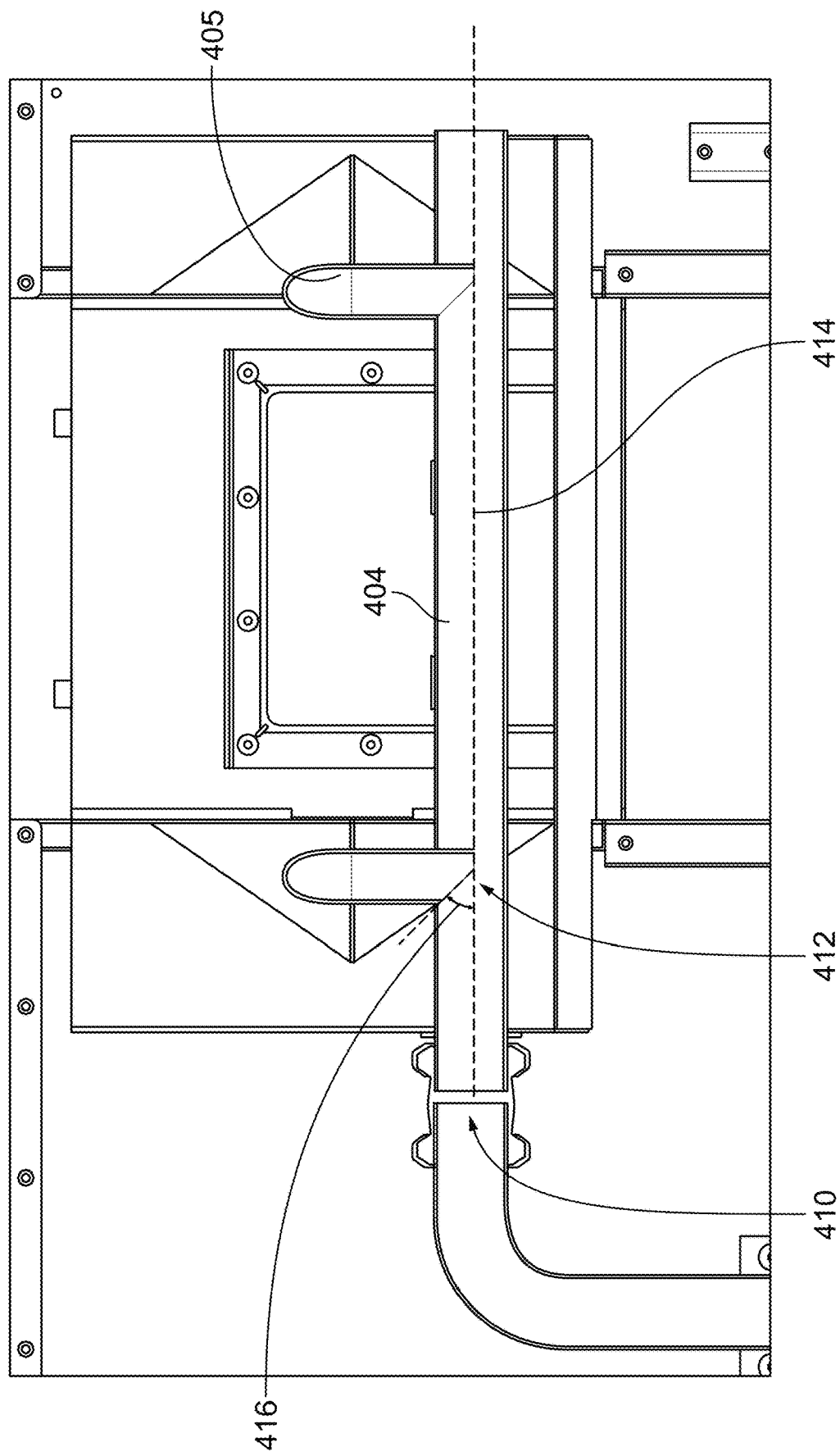
FIG. 4 is a front cross-sectional view of a bypass conduit portion of the intake system of FIG. 2.

The ejector lines 405 are structured to deliver the excess air/fuel charge from the header line 404 to the inlet transitions 350 that feed the compressors 300 (see also FIG. 1). As shown in FIG. 3, the ejector lines 405 are engaged with and fluidly connected to the header line 404. FIG. 4 shows a front cross-sectional view through the header line 404 and ejector lines 405. As shown, each of the ejector lines 405 has an intruding profile that descends radially into the header line 404 such that an inlet end 412 of each of the ejector lines 405 protrudes into the header line 404. In the embodiment of FIG. 4, the inlet end 412 of each ejector line 405 extends to a central position within the header line 404 (e.g., down to a central axis 414 of the header line 404). The inlet end 412 of the ejector line 405 is cutoff at an oblique angle 416 (e.g., cutoff angle) relative to the central axis 414 of the header line 404 so as to increase the flow area at the inlet to the ejector lines 405 and to guide the flow into the ejector lines 405. In some embodiments, the oblique angle 416 varies within a range between approximately 30° and 60°. However, it should be appreciated that the foregoing range is merely illustrative of representative dimensions and that none of the embodiments are limited to such dimensions or the relative relationships of such dimensions. In other embodiments, the intruding dimension of the ejectors lines 405 and/or cutoff angle of the ejector lines 405 may be different.

As shown in FIG. 4, a cutoff portion 418 of the ejector lines 405 faces towards the inlet end 410 of the header line 404. The intruding profile of the ejector lines 405 increases the pressure drop across the header line 404 and promotes flow uniformity between the ejector lines 405 to ensure an approximately equal amount of the excess air/fuel charge is delivered to each of the compressors 300 (see also FIG. 1). This structure also eliminates the need to modify the size of individual ejector lines 405 to maintain balanced flow between multiple compressors 300. Obviating the need for such modifications ensures that the flow profile entering the compressors 300 will be substantially the same. In other embodiments, the flow rate of the excess air/fuel charge may be split equally between the compressors 300 by modifying the dimensions of each one of the ejector lines 405 independently from one another. For example, the hydraulic diameter (e.g., inner diameter for a circular conduit) of the downstream ejector line 405 (e.g., rightmost ejector line 405 shown in FIG. 4) may be increased relative to the upstream ejector line 405 (e.g., leftmost ejector line 405 shown in FIG. 4) in order to balance flow between the ejector lines 405. In yet other embodiments, balanced flow may be achieved by modifying the cutoff angle (e.g., oblique angle 416) for different ejector lines 405 along the flow direction and/or the relative lengths of the ejector lines 405.

Figure 5:
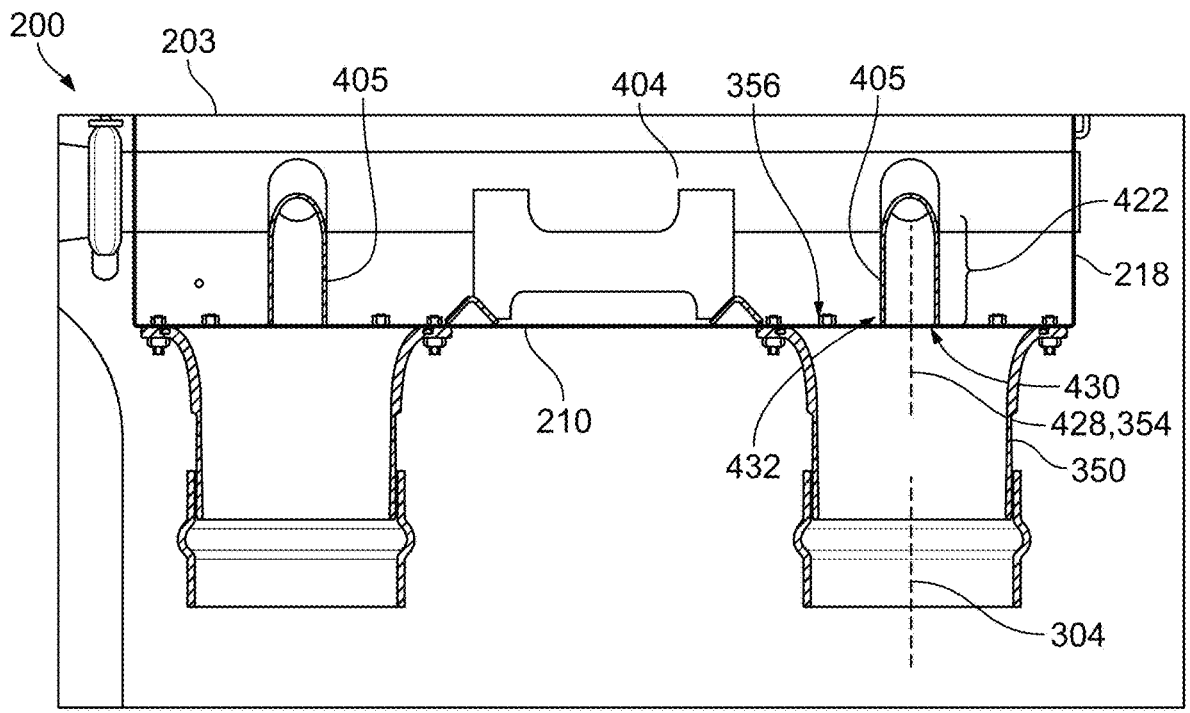
FIG. 5 is a top cross-sectional view of a compressor inlet transition portion of the intake system of FIG. 2.
Figure 6:
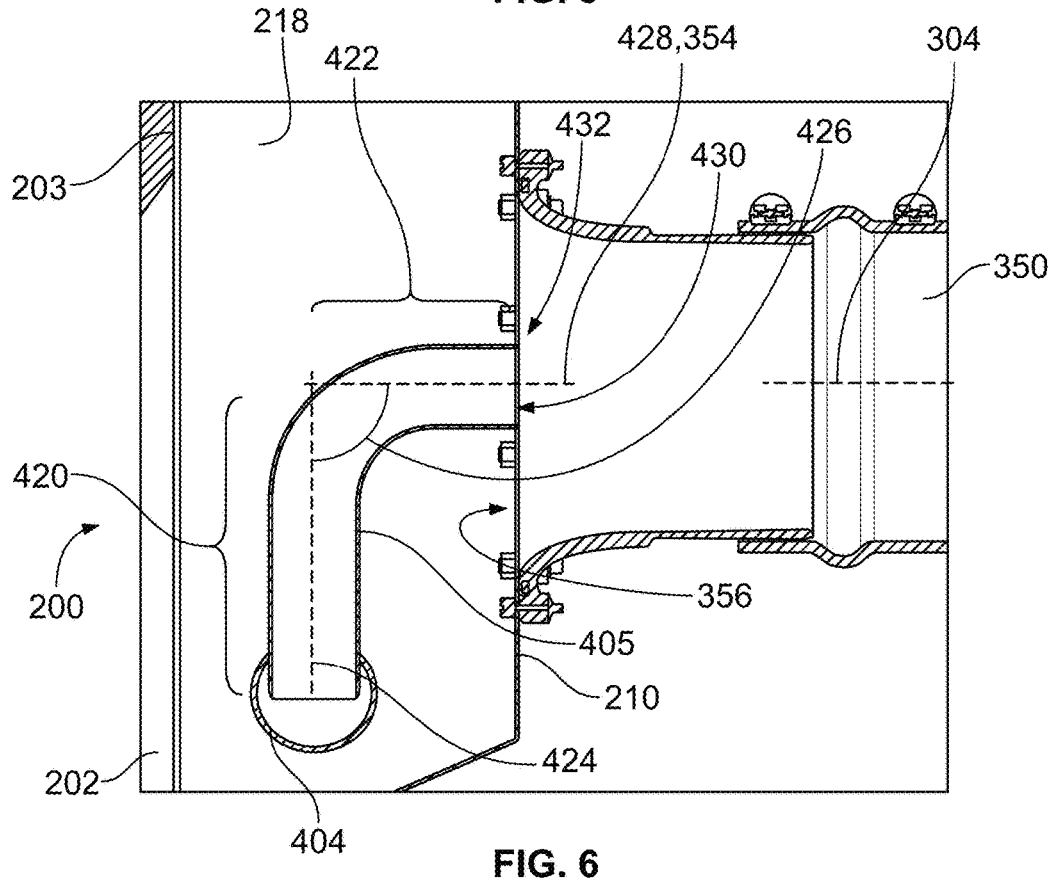
FIG. 6 is a side cross-sectional view of a compressor inlet transition portion of the intake system of FIG. 2.

FIGS. 5-6 show top and side cross-sectional views, respectively, through the ejector lines 405. As shown in FIGS. 5-6, the header line 404 is disposed at an intermediate longitudinal position that is approximately half way between the forward wall 210 and the end wall 203 of the compressor intake manifold 200 (e.g., main housing 202). However, it should be appreciated that the exact position of the header line 404 may differ in various embodiments. As shown in FIGS. 5-6, each ejector line 405 includes a first portion 420 and a second portion 422 (e.g., outlet portion, etc.) fluidly connected to the first portion 420. The first portion 420 is welded or otherwise coupled to the header line 404. The first portion 420 is fluidly connected to the header line 404 and extends radially away from the header line 404 in a direction that is substantially parallel to both the forward wall 210 and the lateral walls 218 (e.g., vertically upward as shown in FIG. 6, etc.), such that a central axis 424 of the first portion 420 is substantially parallel to the forward wall 210 and the lateral walls 218. As shown in FIG. 6, the second portion 422 of each ejector line 405 extends at an angle 426 from the first portion 420 and toward a respective one of the inlet transitions 350. In the embodiment of FIGS. 5-6, the second portion 422 extends at an approximately 90° angle from the first portion 420, such that a flow direction through the second portion 422 is substantially parallel to a flow direction through a respective one of the inlet transitions 350 (e.g., such that a center line 428 of the second portion 422 is substantially parallel to a central axis 354 of the inlet transition 350). In the embodiment of FIGS. 5-6, the first portion 420 and the second portion 422 are integrally formed as a single unitary conduit that is bent or otherwise formed into the desired shape. Both the header line 404 and the ejector line 405 may be made from the same or different materials (e.g., steel tubing or another suitable material).

As shown in FIGS. 5-6, a center line 428 (e.g., central axis) through the second portion 422 of each ejector line 405 is substantially collinear with (i) a central axis 354 of a respective one of the inlet transitions 350, and (ii) a central axis 304 of a respective one of the compressor impellers/wheels (e.g., an axis about which a respective one of the compressor impellers rotates, compressor inlets, etc.), which may be the same as the central axis of a respective one of the compressors 300. In this way, the excess air/fuel charge leaving each ejector line 405 is directed toward a central position along the impeller throat (e.g., a central position along the inlet to the compressor 300, center of the impeller, etc.), which, advantageously, promotes flow uniformity and reduces the risk of flow separation within the compressor 300. As shown in FIGS. 5-6, an outlet end 432 of each ejector line 405 is disposed at an inlet end 356 (e.g., inlet, etc.) of a respective one of the inlet transitions 350 (e.g., an inlet end of the opening in the forward wall 210) so that the outlet end 432 is substantially flush with the inlet end 356. In other embodiments, each of the ejector lines 405 may extend at least partially into the inlet transitions 350 so that the inlet transitions 350 circumscribe (e.g., surrounds, encompasses, etc.) the ejector lines 405. Among other benefits, the position of the outlet end of each ejector line 405 shown in FIGS. 5-6 reduces flow restriction and pressure drop across the inlet transitions 350.

A hydraulic diameter (e.g., inner diameter for a circular conduit, etc.) of each one of the ejector lines 405 is approximately constant along an entire length of the ejector lines 405. A combined hydraulic flow area through the plurality of ejector lines 405 is approximately the same as the hydraulic flow area through both the header line 404 and the intermediate conduit 402. In other words, the hydraulic flow area of the bypass conduit 400 is approximately constant along the entire length of the bypass conduit 400. Among other benefits, sizing the bypass conduit 400 to have an approximately constant hydraulic flow area ensures that the velocity of the excess air/fuel charge is maintained throughout the bypass conduit 400, which reduces the residence time required for the excess air/fuel charge to pass through the compressor bypass reintroduction system, thereby lowering the risk of transient events associated with rapid engine loading/unloading operations.

Figure 7:
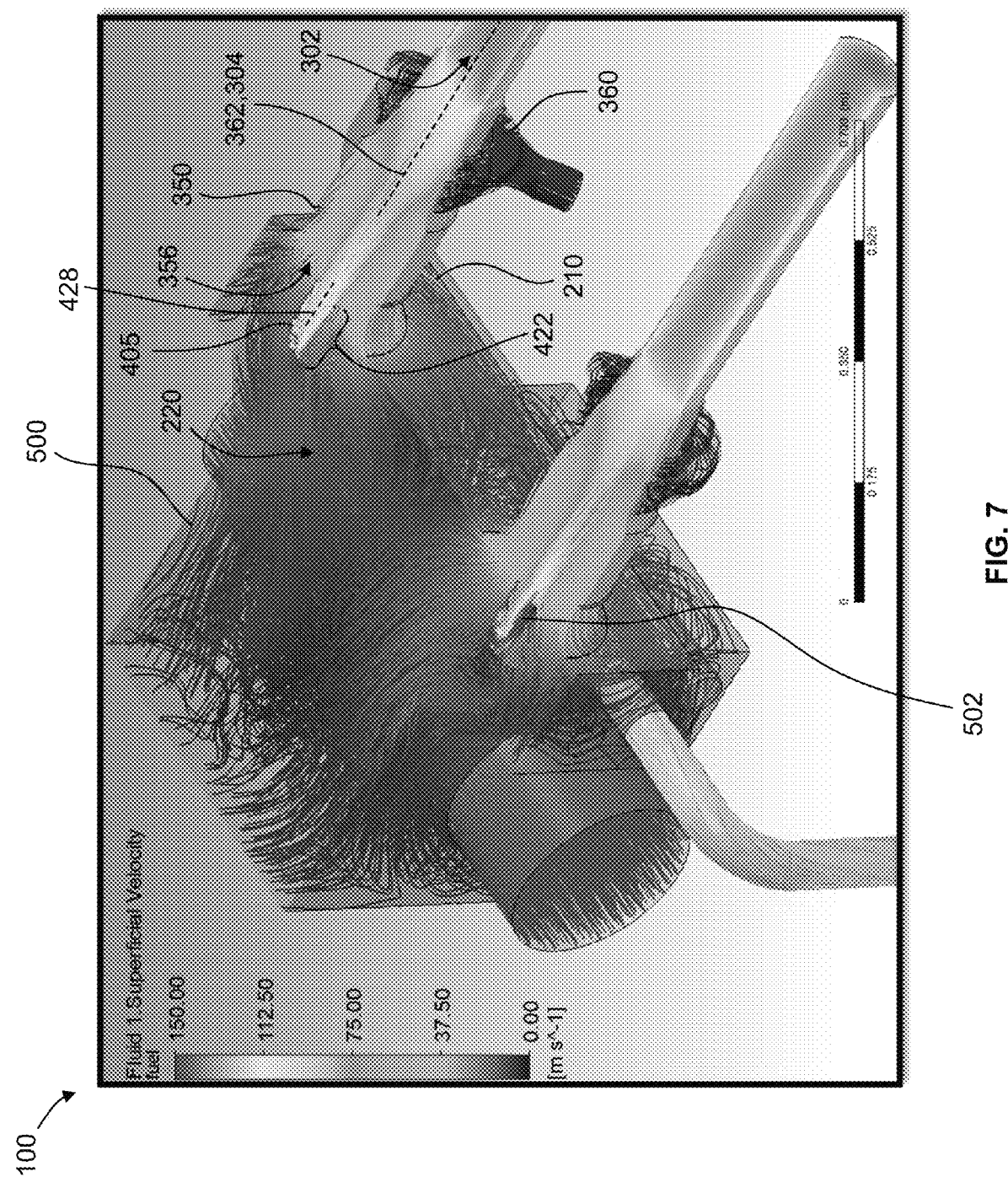
FIG. 7 is a perspective view of a flow velocity profile of the intake system of FIG. 2, according to an embodiment.

FIG. 7 shows a diagram of a simulated velocity profile through the intake system 100. The flow streamlines are colored to represent the velocity of the flow passing through different portions of the intake system 100. The blue colored streamlines 500 represent areas of flow velocity flow through the intake system 100, while red colored streamlines 502 represent areas of relatively high velocity flow. As shown, flow from the ejector lines 405 is introduced as close to the inlet transitions 350 as possible to lower the change in hydraulic flow area along the control volume between the engine air/fuel intake system and the inlet 302 of the compressors 300 (see FIG. 1). The high fluid velocity of fluid leaving the ejector lines 405 facilitates mixing between (i) the excess air/fuel charge and (ii) the filtered air entering the inlet transitions 350 from the fluid plenum 220. Because the excess air/fuel charge is introduced at an inlet to the inlet transitions 350, mixing may occur along the entire length of the inlet transitions 350 between the forward wall 210 and the compressors 300. Moreover, the density of the air/fuel charge leaving the ejector lines 405 may be different from the density of the filtered air entering the inlet transitions 350 from the fluid plenum 220. This difference in density is attributable at least in part to the difference(s) in composition and temperature between the air/fuel charge and the filtered air. By introducing the air/fuel charge collinearly with the compressor impeller, the variation in circumferential density is reduced, thereby improving the overall performance of the compressor.

Additionally, by introducing the excess air/fuel charge parallel to the direction of fresh air flow through the inlet transitions 350, the flow discharge acts as an ejector that increases the velocity of fresh air passing through the inlet transition 350. In other words, the high velocity flow of the excess air/fuel charge leaving the ejector lines 405 creates a region of low pressure at the inlet end 356 of the inlet transitions 350, which draws in filtered air from the fluid plenum 220 upstream of the inlet transitions 350. The smooth parallel flow also reduces pressure drop across the fluid plenum 220 and inlet transitions 350, which largely cancels any additional restriction resulting from the positioning the ejector lines 405 within the flow stream. Moreover, because the excess air/fuel charge is introduced near the center of the inlet transitions 350, the aerodynamic performance of the compressors 300 is less sensitive to sudden changes in flow rate through the bypass conduit 400.

As shown in FIG. 7, the ejector lines 405 introduce the excess air/fuel charge into the inlet transition 350 at a location that is upstream of the fuel mixers 360 and in close proximity to the fuel mixers 360. The fuel mixers 360 are coupled to the intake system downstream of the inlet transitions 350 and introduce fuel into the mixed fluid leaving the inlet transition 350 (e.g., a mixture of the excess air/fuel charge with the filtered air). The fuel mixers 360 are substantially circular and surround the flow stream leaving the inlet transitions 350. As shown in FIG. 7, a center line 428 through the second portion 422 of each ejector line 405 is substantially collinear with a central axis 362 (e.g., center line) of a respective one of the fuel mixers 360 and a central axis 304 of a respective one of the compressors 300. Because of the flow stability resulting from the arrangement of the ejector lines 405, inlet transitions 350, fluid mixers 360, and compressors 300, the variation in the air/fuel ratio of the mixture entering the compressor 300 is reduced, which improves the overall performance of the engine in one or more embodiments. It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A compressor bypass reintroduction system, comprising:
    a compressor intake manifold defining a fluid plenum, the compressor intake manifold engageable with a compressor; and
    a bypass conduit extending into the fluid plenum, the bypass conduit comprising an ejector line, the ejector line having an outlet portion that is configured to be substantially collinear with the compressor and to discharge flow toward the compressor.

2. The compressor bypass reintroduction system of claim 1, wherein the outlet portion is disposed proximate to an outlet of the fluid plenum that discharges flow into the compressor.

3. The compressor bypass reintroduction system of claim 1, further comprising a fuel injection device disposed downstream of the bypass conduit, the outlet portion substantially collinear with a central axis of the fuel injection device.

4. The compressor bypass reintroduction system of claim 1, further comprising a compressor bypass valve coupled to the bypass conduit and configured to regulate flow through the bypass conduit.

5. The compressor bypass reintroduction system of claim 1, wherein the bypass conduit comprises a header line fluidly coupled to the ejector line and configured to deliver flow to the ejector line, the ejector line further comprising a first portion coupled to the header line and extending away from the header line, wherein the outlet portion extends at an angle from the first portion.

6. The compressor bypass reintroduction system of claim 1, wherein a hydraulic diameter of the bypass conduit is substantially constant along an entire length of the bypass conduit.

7. The compressor bypass reintroduction system of claim 1, wherein the bypass conduit comprises a header line fluidly coupled to the ejector line and configured to deliver flow to the ejector line, wherein the ejector line is one of a plurality of ejector lines coupled to the header line.

8. The compressor bypass reintroduction system of claim 1, wherein the outlet portion is arranged to direct flow in a direction that is substantially parallel a central axis of the compressor.

9. The compressor bypass reintroduction system of claim 1, wherein the bypass conduit comprises a header line fluidly coupled to the ejector line and configured to deliver flow to the ejector line, and wherein the ejector line protrudes into the header line.

10. The compressor bypass reintroduction system of claim 1, wherein the outlet portion is configured to be substantially collinear with an axis of a compressor impeller.

11. A compressor bypass reintroduction system, comprising:
    a compressor intake manifold defining a fluid plenum;
    an inlet transition coupled to the compressor intake manifold and fluidly connected to the fluid plenum; and
    a bypass conduit extending into the fluid plenum, the bypass conduit comprising an ejector line, the ejector line having an outlet portion that is substantially collinear with the inlet transition, the outlet portion having an opening that faces the inlet transition.

12. The compressor bypass reintroduction system of claim 11, wherein the outlet portion of the ejector line is disposed proximate to an inlet of the inlet transition.

13. The compressor bypass reintroduction system of claim 11, further comprising a fuel injection device disposed downstream of the inlet transition, wherein the outlet portion is substantially collinear with the fuel injection device.

14. The compressor bypass reintroduction system of claim 11, further comprising a compressor bypass valve coupled to the bypass conduit and configured to regulate flow through the bypass conduit.

15. The compressor bypass reintroduction system of claim 11, wherein a hydraulic diameter of the bypass conduit is approximately constant along an entire length of the bypass conduit.

16. The compressor bypass reintroduction system of claim 11, wherein the bypass conduit includes a header line fluidly coupled to the ejector line and configured to deliver flow to the ejector line, the ejector line further comprising a first portion coupled to the header line and extending away from the header line, wherein the outlet portion is arranged substantially parallel to the inlet transition.

17. The compressor bypass reintroduction system of claim 11, wherein the bypass conduit comprises a header line fluidly coupled to the ejector line and configured to deliver flow to the ejector line, and wherein the ejector line protrudes into the header line.

18. An intake system for an engine, comprising:
a compressor;
a compressor intake manifold defining a fluid plenum; and
a compressor bypass reintroduction system, comprising:
a inlet transition coupled to the compressor intake manifold and fluidly connecting the fluid plenum to the compressor; and
a bypass conduit comprising an ejector line, the ejector line having an outlet portion that is substantially collinear with the compressor and configured to discharge flow towards the compressor.

19. The intake system of claim 18, wherein the compressor is one of a plurality of compressors, the inlet transition is one of a plurality of inlet transitions fluidly coupled to a respective one of the plurality of compressors, and the ejector line is one of a plurality of ejector lines, wherein an outlet portion of each ejector line of the plurality of ejector lines is disposed at an inlet of a respective one of the plurality of inlet transitions to balance flow to each of the plurality of compressors.

20. The intake system of claim 18, wherein flow discharged from the ejector line increases a velocity of fluid passing through the inlet transition so as to reduce pressure loss across the inlet transition.

21. The intake system of claim 18, wherein an opening of the outlet portion is arranged substantially coaxially with the inlet transition.

22. The intake system of claim 18, wherein the ejector line further comprises a first portion, wherein the outlet portion extends at an angle from the first portion, and wherein the outlet portion arranged substantially parallel to the inlet transition.

23. The intake system of claim 18, wherein a hydraulic diameter of the bypass conduit is approximately constant along an entire length of the bypass conduit.

24. The intake system of claim 18, further comprising a fuel injection device disposed between the outlet portion and the compressor, the ejector line substantially collinear with a central axis of the fuel injection device.

25. The intake system of claim 18, wherein the outlet portion is substantially collinear with an axis of a compressor impeller.

* * * * *

UNITED STATES PATENT AND TRADEMARK OFFICE
CERTIFICATE OF CORRECTION

| | | |
|---|---|---|
| PATENT NO. | : 11,174,822 B1 | Page 1 of 1 |
| APPLICATION NO. | : 16/927606 | |
| DATED | : November 16, 2021 | |
| INVENTOR(S) | : Lackey et al. | |

It is certified that error appears in the above-identified patent and that said Letters Patent is hereby corrected as shown below:

On the Title Page

Column 1 Item (72) add:
Charles D. Knealing, Minneapolis, MN (US)

Signed and Sealed this
Second Day of January, 2024

Katherine Kelly Vidal
*Director of the United States Patent and Trademark Office*